United States Patent
Nakazato (10) Patent No.: US 7,652,392 B2
(45) Date of Patent: Jan. 26, 2010

(54) POWER SUPPLY DEVICE AND HIGH-FREQUENCY CIRCUIT SYSTEM

(75) Inventor: Yukihira Nakazato, Kanagawa (JP)

(73) Assignee: NEC Microwave Tube, Ltd., Kanagawa (JP)

(*) Notice: Subject to any disclaimer, the term of this patent is extended or adjusted under 35 U.S.C. 154(b) by 169 days.

(21) Appl. No.: 11/834,491

(22) Filed: Aug. 6, 2007

(65) Prior Publication Data
US 2008/0054719 A1 Mar. 6, 2008

(30) Foreign Application Priority Data
Aug. 30, 2006 (JP) ............... 2006-233438

(51) Int. Cl.
*H02J 3/00* (2006.01)
(52) U.S. Cl. ........................................ 307/17
(58) Field of Classification Search .................. 307/17, 307/105; 315/3.5
See application file for complete search history.

(56) References Cited

U.S. PATENT DOCUMENTS 4,323,853 A * 4/1982 Kurokawa .................. 330/43
6,154,382 A * 11/2000 Kawahara et al. ............. 363/68

FOREIGN PATENT DOCUMENTS

JP 9-17344 A 1/1997
JP 2000-201481 A 7/2000

OTHER PUBLICATIONS

S.D. Johnson et al., "Comparison of Resonant Topologies in High-Voltage DC Application", IEEE Transactions on Aerospace and Electronic Systems, May 1988, pp. 263-274, vol. 24 No. 3, IEEE.
In-Wha Jeong et al., "Development of a power supply for 20 kV 10 kW class high voltage capacitor charging", Jul. 12-15, 2004, pp. 819-821.

* cited by examiner

Primary Examiner—Albert W Paladini
Assistant Examiner—Carlos Amaya
(74) Attorney, Agent, or Firm—Sughrue Mion, PLLC

(57) ABSTRACT

The present invention includes: a transformer; a primary source for supplying an alternating voltage of at least two frequencies to a primary winding of the transformer; and a filter circuit connected to a secondary winding of the transformer and having an attenuation that varies according to the frequency of the alternating voltage, where the frequency of the alternating voltage supplied to the primary winding of the transformer is controlled so that a desired alternating voltage is outputted from the filter circuit connected to the secondary winding of the transformer.

8 Claims, 6 Drawing Sheets

POWER SUPPLY DEVICE AND HIGH-FREQUENCY CIRCUIT SYSTEM

This application is based upon and claims the benefit of priority from Japanese patent application No. 2006-233438, filed on Aug. 30, 2006, the disclosure of which is incorporated herein in its entirety by reference.

BACKGROUND OF THE INVENTION

1. Field of the Invention

The present invention relates to a power supply device suitable to supply a power supply voltage to a traveling-wave tube and the like and a high-frequency circuit system including the power supply device.

2. Description of the Related Art

Figure 1:
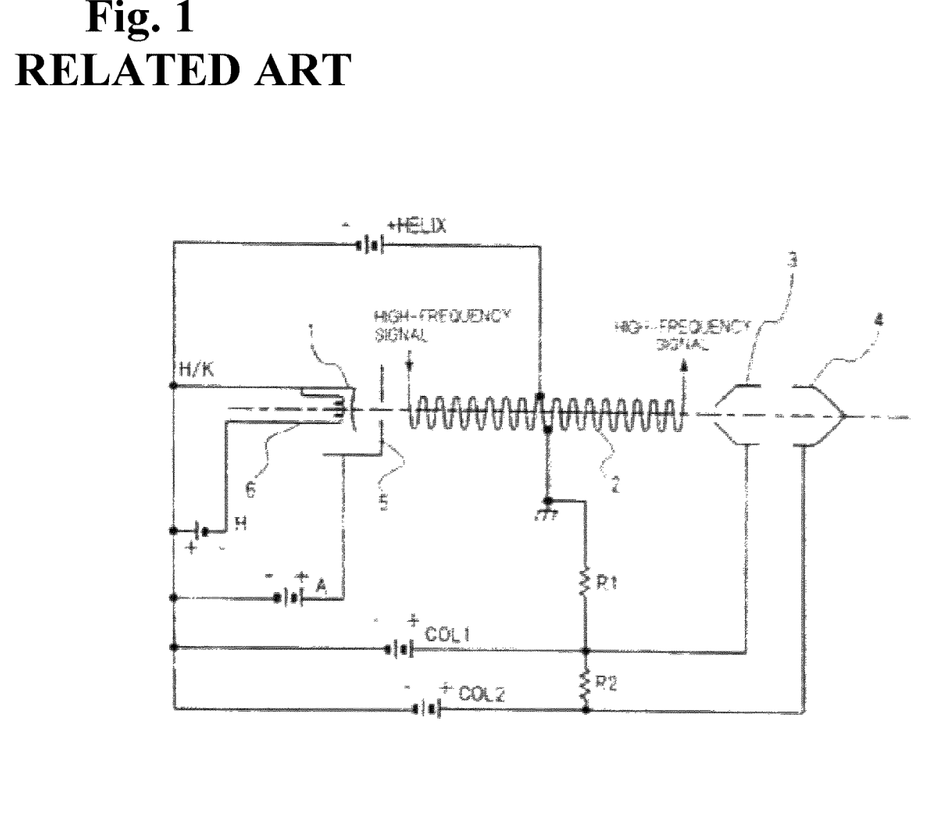
FIG. 1 is a block diagram showing a configuration example of a high-frequency circuit system including a traveling-wave tube and a power supply device.

A traveling-wave tube, a klystron and the like are electronic tubes used to amplify and oscillate a high-frequency signal by interaction between an electron beam emitted from an electron gun and a high-frequency circuit. As shown in FIG. 1 for instance, the traveling-wave tube has a configuration including cathode electrode 1 for emitting the electron beam, helix 2 which is a high-frequency circuit for causing interaction between the electron beam emitted from cathode electrode 1 and the high-frequency signal (microwave), first collector electrode 3 and second collector electrode 4 for trapping the electron beam emitted from helix 2, and anode electrode 5 for drawing an electron from cathode electrode 1 and guiding the electron beam emitted from cathode electrode 1 into helix 2. Cathode electrode 1 includes heater 6 which provides heat energy for emitting a thermion from cathode electrode 1.

The electron beam emitted from cathode electrode 1 is accelerated by a potential difference between cathode electrode 1 and helix 2 and introduced into helix 2, and proceeds inside helix 2 while interacting with the high-frequency signal inputted to helix 2. The electron beam outputted from helix 2 is trapped by first collector electrode 3 and second collector electrode 4. In this case, the high-frequency signal amplified by the interaction with the electron beam is outputted from helix 2.

As shown in FIG. 1, cathode electrode 1 is supplied with helix voltage (HELIX) which is a negative direct-current voltage on the basis of the electric potential of helix 2. First collector electrode 3 is supplied with first collector voltage (COL1) which is a positive direct-current voltage on the basis of the electric potential (H/K) of cathode electrode 1. Second collector electrode 4 is supplied with second collector voltage (COL2) which is a positive direct-current voltage on the basis of the electric potential (H/K) of cathode electrode 1. Anode electrode 5 is supplied with anode voltage (A) which is a positive direct-current voltage on the basis of the electric potential (H/K) of cathode electrode 1. And heater 6 is supplied with a heater voltage (H) which is negative direct-current voltage on the basis of the electric potential (H/K) of cathode electrode 1. Helix 2 is normally connected to the case of the traveling-wave tube that is grounded.

Helix voltage (HELIX), first collector voltage (COL1), second collector voltage (COL2), anode voltage (A) and heater voltage (H) are generated by using an inverter for converting the direct-current voltage to an alternating voltage, a transformer, a rectifier circuit, a rectification capacitor and the like. Bleeder resistances R1 and R2 are connected between helix 2 and first collector electrode 3 and between first collector electrode 3 and second collector electrode 4 for the sake of suppressing a rise in first collector voltage (COL1) and second collector voltage (COL2) generated by a change in the balance of currents passing through first collector electrode 3 and second collector electrode 4 at a low load current.

FIG. 1 shows a configuration example of a traveling-wave tube including two collector electrodes. However, there are also configurations of the traveling-wave tube including only one collector electrode and including three or more collector electrodes. In the case of the configuration including three or more collector electrodes, the bleeder resistances are connected to each of the rectifier circuits for generating collector voltage (COL) supplied to each of the collector electrodes respectively. Resistances of a relatively large value (several MΩ or so) are used as bleeder resistances R1 and R2 for the sake of reducing the current when the traveling-wave tube is operated.

A power supply device for supplying a power supply voltage to each electrode of such a traveling-wave tube is required to supply the traveling-wave tube with heater voltage (H) first to preheat cathode electrode 1 (for 3 to 5 minutes or so) and supply helix voltage (HELIX), anode voltage (A) and collector voltage (COL) after completion of preheating. Therefore, a conventional power supply device adopts a configuration which includes a first high-voltage transformer for generating helix voltage (HELIX), anode voltage (A) and collector voltage (COL) and a second high-voltage transformer for generating only heater voltage (H) so as to control the order of application of power supplied to primary windings of the two high-voltage transformers.

However, a heater power supply for supplying heater voltage (H) needs to secure isolation performance for the sake of using it at a high-voltage potential despite a small current capacity required so that it needs to use an expensive large-size high-voltage transformer. For that reason, there is an increase in circuit size and cost of the power supply device.

Thus, Japanese Patent Laid-Open No. 09-017344 (hereinafter referred to as Patent Document 1) describes a high-voltage power supply circuit wherein the power supply dedicated to the heater is no longer necessary and a high-voltage transformer for that purpose is eliminated. The high-voltage power supply circuit described in Patent Document 1 includes a helix power supply, an anode power supply, a heater/collector power supply connected to a heater power supply and a collector power supply, a relay for interrupting the collector voltage outputted from the heater/collector power supply, a discharge circuit for discharging the collector voltage at an output terminal, and a power control circuit for controlling the order of application of the power supply voltage.

As for the high-voltage power supply circuit described in Patent Document 1, the heater/collector power supply is turned on to supply only the heater voltage in which the collector voltage is interrupted by using the relay (high-voltage vacuum relay). After completion of preheating of the cathode electrode, the heater/collector power supply is once turned off, and an electric charge at the output terminal of the collector voltage is discharged by using the discharge circuit. After completion of the discharge, the helix power supply, anode power supply and heater/collector power supply are all turned on so as to eliminate the need for a high-voltage transformer being dedicated to the heater.

As described above, the conventional power supply device for the traveling-wave tube includes the power supply dedicated to the heater. Therefore, it is necessary to include multiple, expensive large-size high-voltage transformers, and so there is a problem that the power supply device becomes larger and the cost increases.

The above-mentioned bleeder resistance connected between the helix and the collector electrode has a high applied voltage so that consumed electric power is large even though the amount of current passing through it is small. Thus, a package of bleeder resistance becomes large in order to acquire sufficient withstanding electric power. For that reason, there is a problem that the implementation area of the bleeder resistance becomes large. In the case where the bleeder resistance is not used, it is necessary to use a high-voltage regulator circuit whose variable capacity is large so that the collector voltage becomes stable even if the load current significantly fluctuates in a short time. Therefore, it is not possible, even in such a configuration, to avoid an increase in the circuit size and cost of the power supply device.

A high-frequency circuit system including the traveling-wave tube and the power supply device thereof is used not only for various radio communications and terrestrial broadcasts but also for satellite communications and satellite broadcasts or mobile communications. Therefore, there is an increasing demand for miniaturization, lighter weight and cost reduction of the system.

The above-mentioned high-voltage power supply circuit described in Patent Document 1 is effective at rendering a power supply that is dedicated to the heater unnecessary and reducing the number of expensive and large-size high-voltage transformers. However, the circuit cannot reduce other large-size parts such as the high-voltage vacuum relay and bleeder resistances. Thus, it is not sufficient for achieving further miniaturization and cost reduction.

SUMMARY OF THE INVENTION

Thus, an object of the present invention is to provide a power supply device capable of realizing further miniaturization and cost reduction and a high-frequency circuit system including the power supply device.

To attain the object, an exemplary aspect of the present invention provides a power supply device including:

a transformer;

a primary source for supplying an alternating voltage of at least two frequencies to a primary winding of the transformer; and a filter circuit connected to a secondary winding of the transformer and having an attenuation that varies according to the frequency of the alternating voltage.

The present invention provides a high-frequency circuit system including:

the power supply device; and a traveling-wave tube to which a power supply voltage is supplied from the power supply device.

In the above configuration, a required alternating voltage is outputted from the filter circuit by setting the frequency of the alternating voltage supplied, from a primary side of the transformer at a frequency signal that will pass through (not attenuating) the filter circuit, for instance. The alternating voltage outputted from the filter circuit can be interrupted by setting it as a frequency so that the frequency signal does not pass through the filter circuit. To be more specific, it is possible to control passage and interruption of the alternating voltage on the secondary side by setting the frequency of the alternating voltage supplied from the primary side of the transformer. The alternating voltage can be selectively outputted from the secondary side of the transformer. For that reason, it is possible to control the order of application of various power supplies without it being necessary to have a high-voltage transformer dedicated to a heater.

It is possible to constantly control the alternating voltage outputted from the filter circuit by setting the frequency of the alternating voltage supplied from the primary side of the transformer on a frequency slope that is characteristic of a low-pass filter provided on the secondary side and by changing the frequency of the alternating voltage supplied from the primary side according to the load on the secondary side for instance. Therefore, an output voltage on the secondary side can be stabilized without a bleeder resistance. It is also possible to narrow the operating voltage range of a regulator circuit and the like provided on the secondary side of the transformer and thus to use a small-size and low-cost regulator circuit.

Therefore, it is possible to reduce circuit components so as to allow a small-size and low-cost power supply device to be realized.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Next, the present invention will be described with reference to the attached drawings.

A power supply device of the present invention adopts a system wherein a filter circuit is connected to a secondary winding of a transformer, and control is exerted over a frequency of an alternating voltage supplied from a primary winding of the transformer so as to output a desired alternating voltage from the filter circuit connected to the secondary winding of the transformer.

First Exemplary Embodiment

Figure 2:
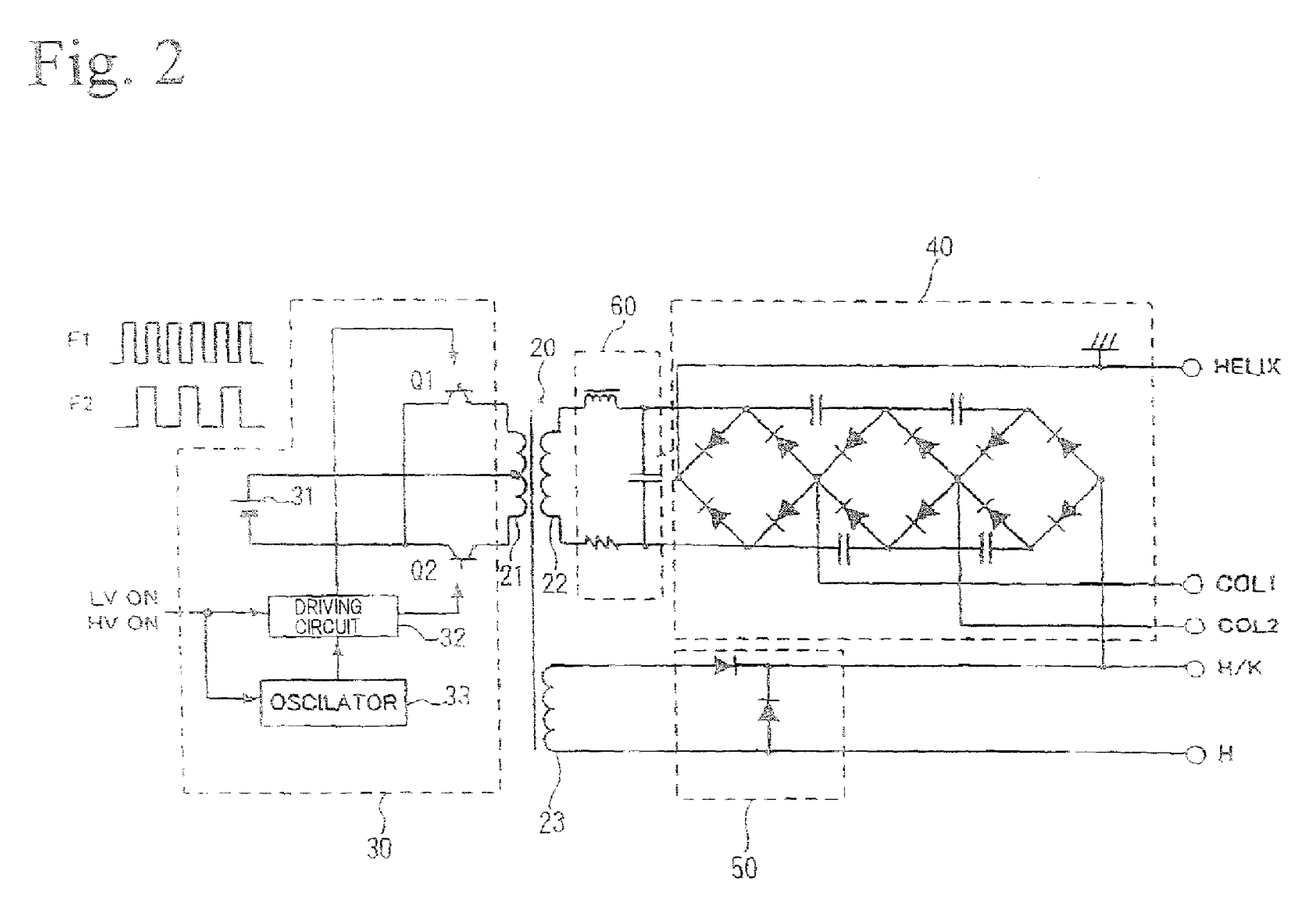
FIG. 2 is a block diagram showing the configuration of a first exemplary embodiment of the power supply device according to the present invention.
Figure 3:
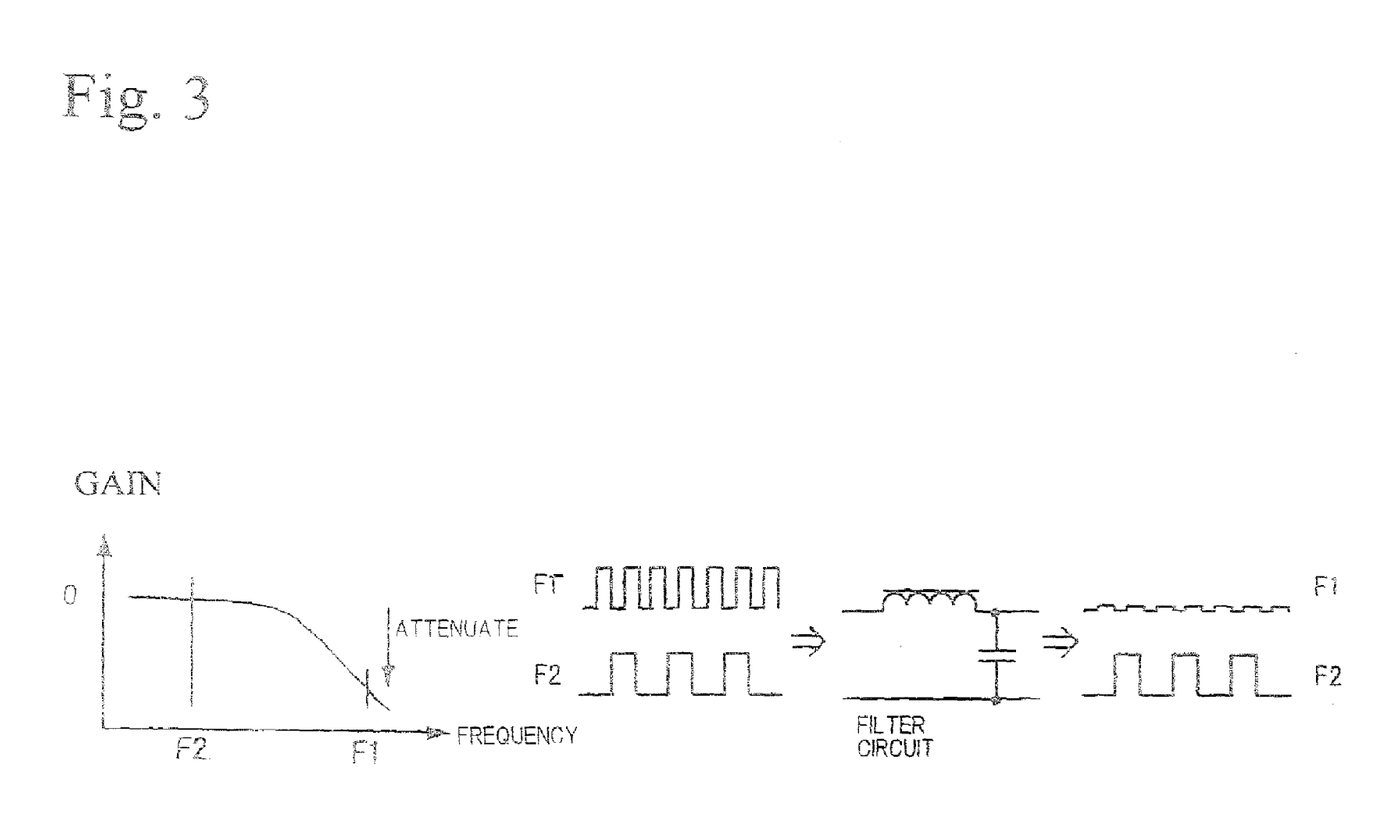
FIG. 3 is a schematic diagram showing the principle of operation of the power supply device according to the first exemplary embodiment.

FIG. 2 is a block diagram showing a configuration of a first exemplary embodiment of the power supply device according to the present invention. FIG. 3 is a schematic diagram showing a principle of operation of the power supply device according to the first exemplary embodiment.

The power supply device of the first exemplary embodiment is an example in which passage and interruption of the alternating voltage outputted from the secondary side are controlled by the frequency of the alternating voltage supplied from the primary side of a high-voltage transformer. In the case where a low-pass filter is provided on the secondary side of the high-voltage transformer for instance, a required alternating voltage is supplied to a rectifier circuit connected to the secondary side of the high-voltage transformer by setting the frequency of the alternating voltage supplied from the primary side of the high-voltage transformer at a sufficiently low frequency signal that will pass through (not attenuating) the low-pass filter. On the other hand, it is possible to interrupt the alternating voltage supplied to the rectifier circuit connected to the secondary side of the high-voltage transformer by setting the frequency of the alternating voltage supplied from the primary side of the high-voltage transformer at a sufficiently high frequency signal that will not pass through (of a large attenuation) the low-pass filter.

As shown in FIG. 2, the power supply device of the first exemplary embodiment has a configuration including high-voltage transformer 20, inverter (primary power supply) 30 for supplying the alternating voltage from primary winding 21 of high-voltage transformer 20, first rectifier circuit 40 for generating helix voltage (HELIX), first collector voltage (COL1) and second collector voltage (COL2) which are supplied to a traveling-wave tube, filter circuit 60 connected to the input side of first rectifier circuit 40 and second rectifier circuit 50 for generating heater voltage (H) supplied to the traveling-wave tube. Filter circuit 60 uses the low-pass filter that has been configured by using an inductor, a capacitor, a resistance and the like. Filter circuit 60 is not limited to the low-pass filter but may also be a high-pass filter or a band-pass filter.

Inverter 30 includes direct-current voltage source 31, transistors Q1 and Q2 for converting a direct-current voltage outputted from direct-current voltage source 31 to the alternating voltage, driving circuit 32 for alternately turning on and off transistors Q1 and Q2, and oscillator (OSCILLATOR) 33 for generating frequency signals (frequencies F1, F2) for switching on/off periods of transistors Q1 and Q2.

As shown in FIG. 3, oscillator 33 generates a signal of frequency F1 which does not pass through filter circuit 60 and a signal of frequency F2 which passes through filter circuit 60. Here, the low-pass filter is used as filter circuit 60. Therefore, frequency F1 is set at a sufficiently high frequency to be significantly attenuated by filter circuit 60, and frequency F2 is set at a sufficiently low frequency to pass through filter circuit 60 without being attenuated. In FIG. 3, the rectangular waves whose frequencies are F1 and F2 are described as the frequency signals. However, the frequency signals are not limited to the rectangular waves but may also be sine waves.

Oscillator 33 outputs the signal of frequency F1 when preheating the traveling-wave tube with a heater, and outputs the signal of frequency F2 after completion of preheating with the heater. Here, switching between frequencies F1 and F2 is performed according to signals (LV ON, HV ON) from a control device not shown. In the case where a timer, a counter or the like is included in inverter 30, it is possible to control the switching of output frequencies of oscillator 33 by using the timer or the counter. Driving circuit 32 alternately turns on and off transistors Q1 and Q2 according to the timing of the output frequencies of oscillator 33 and converts the direct-current voltage outputted from direct-current voltage source 31 to the alternating voltage.

High-voltage transformer 20 includes two secondary windings. One of the secondary windings (first secondary winding 22) is connected with filter circuit 60, and is connected via filter circuit 60 with first rectifier circuit 40 for generating helix voltage (HELIX), first collector voltage (COL1) and second collector voltage (COL2). The other secondary winding (second secondary winding 23) of high-voltage transformer 20 is connected with second rectifier circuit 50 for generating heater voltage (H).

As shown in FIG. 2, first rectifier circuit 40 connects three diode bridges via the capacitor and thereby sequentially stacks and outputs second collector voltage (COL2), first collector voltage (COL1) and helix voltage (HELIX) from cathode voltage (H/K).

Second rectifier circuit 50 outputs heater voltage (H) which is a negative direct-current voltage on the basis of the cathode voltage (H/K) outputted from first rectifier circuit 40. A full-wave rectifier circuit composed of two diodes is used as second rectifier circuit 50 for instance.

The power supply device shown in FIG. 2 is an example of a circuit for supplying a power supply voltage to the traveling-wave tube including two collector electrodes. In the case where the number of the collector electrodes of the traveling-wave tube is other than two, the diode bridges included in first rectifier circuit 40 can be provided according to the number of the collector electrodes. In the case where the number of the collector electrodes is one for instance, two diode bridges can be provided. In the case where the number of the collector electrodes is three, four diode bridges can be provided. Moreover, there is no description of an anode power supply for supplying anode voltage (A) to an anode electrode of the traveling-wave tube in the power supply device shown in FIG. 2. As the anode power supply is not directly related to characteristics of this exemplary embodiment, a description thereof will be omitted here.

In such a configuration, if inverter 30 starts an operation due to an LV ON signal supplied from outside, oscillator 33 outputs the signal having frequency F1 first.

Driving circuit 32 alternately turns on and off transistors Q1 and Q2 according to the timing of the signal of frequency F1 outputted from oscillator 33 and converts the direct-current voltage outputted from direct-current voltage source 31 to the alternating voltage of frequency F1. In this case, the alternating voltages of frequency F1 are outputted from first secondary winding 22 and second secondary winding 23 of high-voltage transformer 20 respectively.

However, the alternating voltage of frequency F1 outputted from first secondary winding 22 is significantly attenuated by filter circuit 60 so that it is not supplied to first rectifier circuit 40. On the other hand, the alternating voltage outputted from second secondary winding 23 of high-voltage transformer 20 is supplied as-is to second rectifier circuit 50 because there is no filter circuit 60 so that it is rectified by second rectifier circuit 50 and supplied to the heater of the traveling-wave tube.

Subsequently, if the preheating for the cathode electrode is completed and the HV ON signal is supplied to inverter 30 from the outside, oscillator 33 outputs the signal of frequency F2.

Driving circuit 32 alternately turns on and off transistors Q1 and Q2 according to the timing of the signal of frequency F2 outputted from oscillator 33 and converts the direct-current voltage outputted from direct-current voltage source 31 to the alternating voltage of frequency F2. In this case, the alternating voltage of frequency F2 is outputted from first secondary winding 22 and second secondary winding 23 of high-voltage transformer 20.

In this case, the alternating voltage of frequency F2 outputted from first secondary winding 22 passes through filter circuit 60 and is supplied as-is to first rectifier circuit 40. Therefore, the alternating voltage outputted from first secondary winding 22 is rectified by first rectifier circuit 40 and supplied to a helix electrode and two collector electrodes of the traveling-wave tube respectively.

The alternating voltage outputted from second secondary winding 23 of high-voltage transformer 20 is supplied as-is to second rectifier circuit 50 because there is no filter circuit 60, so that it is rectified by second rectifier circuit 50 and supplied to the heater of the traveling-wave tube.

According to a power supply device of this exemplary embodiment, filter circuit 60 is provided to an output of one of the two second secondary windings of high-voltage transformer 20. And passage and interruption of the alternating voltage on the secondary side are controlled by the frequency of the alternating voltage supplied from the primary side of high-voltage transformer 20. It is thereby possible to selectively output the alternating voltage from the secondary side according to the frequency of the alternating voltage supplied from the primary side of the high-voltage transformer. For that reason, it is possible to control the order of application of power supply voltages to be supplied to the heater and collector electrodes without it being necessary to have the high-voltage transformer dedicated to the heater. Therefore, it is possible to reduce circuit components so as to allow a small-size and low-cost power supply device to be realized.

Second Exemplary Embodiment

Figure 4:
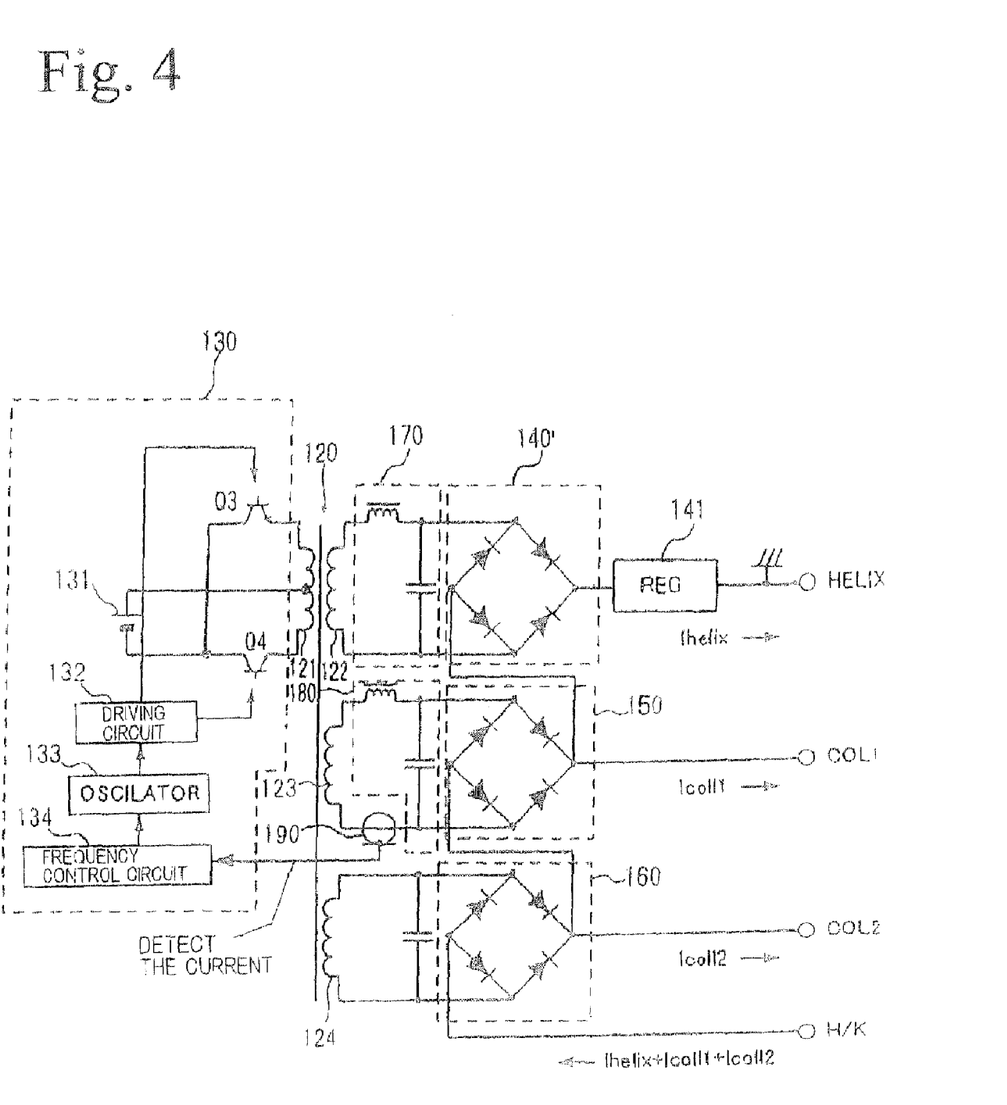
FIG. 4 is a block diagram showing the configuration of a second exemplary embodiment of the power supply device according to the present invention.
Figure 5:
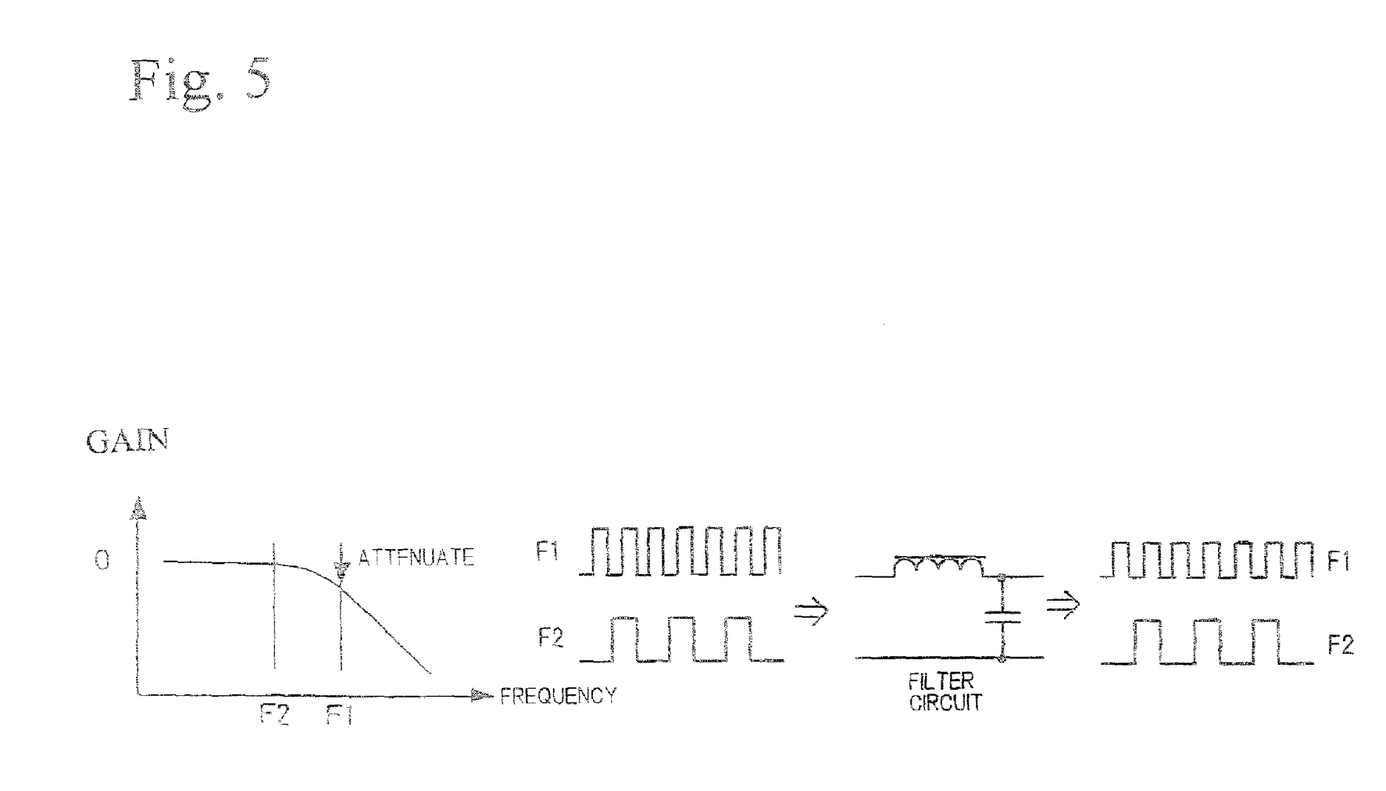
FIG. 5 is a schematic diagram showing the principle of operation of the power supply device according to the second exemplary embodiment.

FIG. 4 is a block diagram showing the configuration of a second exemplary embodiment of the power supply device according to the present invention. FIG. 5 is a schematic diagram showing the principle of operation of the power supply device according to the second exemplary embodiment.

The power supply device of the second exemplary embodiment is an example in which the alternating voltage outputted from the secondary side is constantly controlled by changing the frequency of the alternating voltage supplied from the primary side according to fluctuation of the load current on the secondary side of the high-voltage transformer.

As shown in FIG. 4, the power supply device of the second exemplary embodiment has the configuration including high-voltage transformer 120, inverter (primary power supply) 130 for supplying the alternating voltage from primary winding 121 of high-voltage transformer 120, first rectifier circuit 140 for generating helix voltage (HELIX), regulator circuit 141 for stabilizing helix voltage (HELIX), second rectifier circuit 150 for generating first collector voltage (COL1) and third rectifier circuit 160 for generating second collector voltage (COL2), first filter circuit 170 connected to an input side of first rectifier circuit 140, second filter circuit 180 connected to the input side of second rectifier circuit 150, and current detector 190 for detecting the current passing through second rectifier circuit 150.

First filter circuit 170 and second filter circuit 180 use the low-pass filter that has been configured by using an inductor, a capacitor and the like. The filter circuit is not limited to the low-pass filter but may also be a high-pass filter or a band-pass filter.

Inverter 130 includes direct-current voltage source 131, transistors Q3 and Q4 for converting a direct-current voltage outputted from direct-current voltage source 131 to the alternating voltage, driving circuit 132 for alternately turning on and off transistors Q3 and Q4, and oscillator 133 for generating frequency signals for changing on/off periods of transistors Q3 and Q4, and frequency control circuit 134 for controlling the oscillation frequency of oscillator 133 according to a value of the current passing through second rectifier circuit 150.

Oscillator 133 included in inverter 130 has a configuration wherein its output frequencies are continuously changed within a predetermined range according to an instruction from frequency control circuit 134. As shown in FIG. 5 for instance, oscillator 133 generates signals from frequency F11 positioned on the frequency slope that is characteristic of second filter circuit 180 (or first filter circuit 170) provided on the secondary side of high-voltage transformer 120, to frequency F2 which passes through second filter circuit 180. In FIG. 5, the rectangular waves whose frequencies are F1 and F2 are described as the frequency signals. However, the frequency signals are not limited to the rectangular waves but may also be sine waves.

Driving circuit 132 alternately turns on and off transistors Q3 and Q4 according to the timing of the output frequencies of oscillator 133 and converts the direct-current voltage outputted from direct-current voltage source 131 to the alternating voltage equal to the output frequencies of oscillator 133.

High-voltage transformer 120 includes three secondary windings in accordance with the configuration of the traveling-wave tube. First secondary winding 122 is connected via first filter circuit 170 with first rectifier circuit 140 for generating helix voltage (HELIX). Second secondary winding 123 is connected via second filter circuit 180 with second rectifier circuit 152 for generating first collector voltage (COL1). And third secondary winding 124 is connected with third rectifier circuit 160 for generating second collector voltage (COL2).

First rectifier circuit 140, second rectifier circuit 150 and third rectifier circuit 160 serially connect the diode bridges belonging to each of them so as to serially stack and output second collector voltage (COL2), first collector voltage (COL1) and helix voltage (HELIX) on the basis of cathode voltage (H/K). Such a stacked-type power supply circuit is also described in Japanese Patent Laid-Open No. 2000-201481 for instance.

As in the first exemplary embodiment, the power supply device shown in FIG. 4 is an example of a circuit for supplying the power supply voltage to each electrode of the traveling-wave tube including two collector electrodes. In the case where the number of collector electrodes of the traveling-wave tube is other than two, the secondary windings of the high-voltage transformer and diode bridges can be provided according to the number of the collector electrodes. Moreover, there is no description of the anode power supply for supplying the direct-current voltage to the anode electrode of the traveling-wave tube and the heater power supply for supplying the direct-current voltage to the heater in the power supply device shown in FIG. 4. As these power supplies are not directly related to characteristics of this exemplary embodiment, a description thereof will be omitted here.

In the power supply device shown in FIG. 4, when the amounts of helix current (Ihelix) and first collector current (Icoll1) are small, there is a rise in the voltage between the input terminal of regulator circuit 141 and a rise in the first collector and the voltage between the first collector and the second collector. In particular, the circuit shown in FIG. 3 sequentially stacks and outputs second collector voltage (COL2), first collector voltage (COL1) and helix voltage (HELIX) on the basis of cathode voltage (H/K) as described above. Therefore, fluctuation of output voltages from first secondary winding 122 and second secondary winding 123 causes a great fluctuation of first collector voltage (COL1) and an input terminal voltage of regulator circuit 141.

Figure 6:
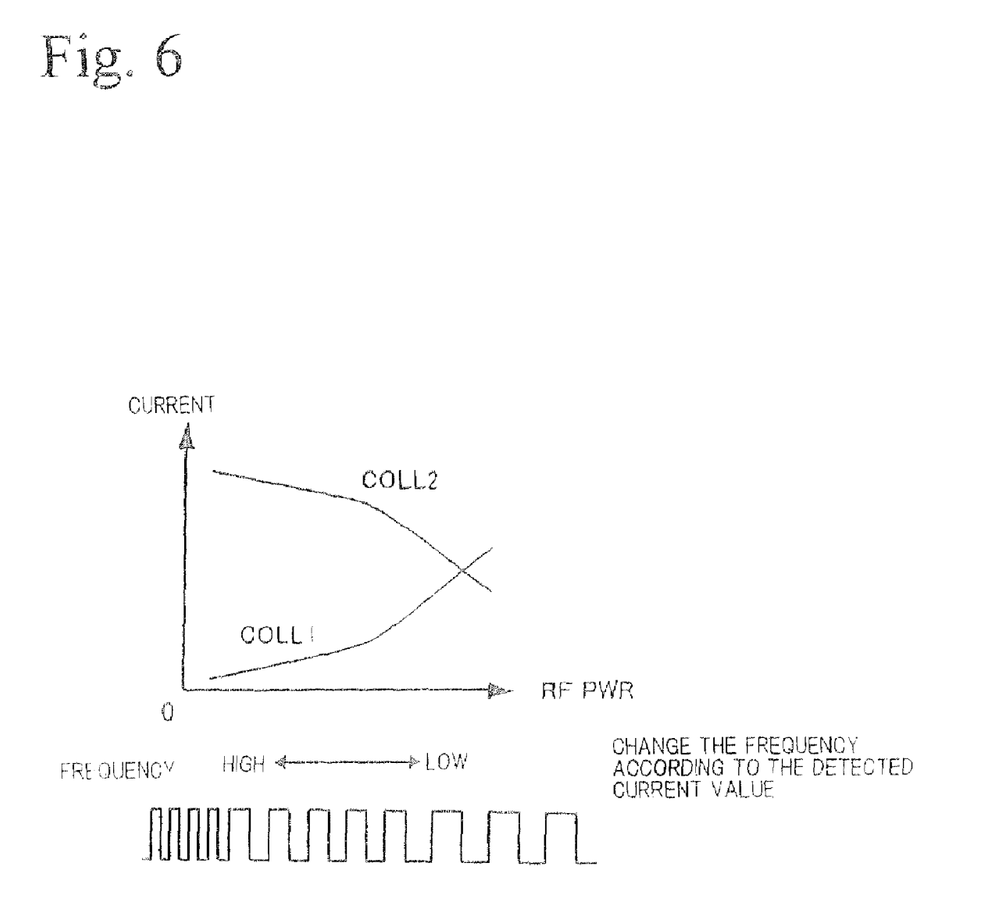
FIG. 6 is a schematic diagram showing the control action of a frequency control circuit shown in FIG. 4.

In the case of the power supply device of the second exemplary embodiment, current detector 190 detects the current passing through second rectifier circuit 150. And frequency control circuit 134 controls the frequency of the output signal of oscillator 133 according to the detected current value as shown in FIG. 6 so as to change the frequency of the alternating voltage supplied from primary winding 121 of high-voltage transformer 120. Driving circuit 132 alternately turns on and off transistors Q3 and Q4 at the frequency of the output signal of oscillator 133, and converts the direct-current voltage outputted from the direct-current voltage source to alternating voltage equal to the output frequencies of oscillator 133.

If the amount of the current passing through the first collector becomes small, frequency control circuit 134 raises the oscillation frequency of oscillator 133 and lowers the voltage supplied to second rectifier circuit 150 via second filter circuit 180 so as to suppress a rise in the output voltage of second rectifier circuit 150 due to reduction in the load current.

Inversely, in the case where the amount of the current passing through the first collector electrode is large, frequency control circuit 134 lowers the oscillation frequency of oscillator 133 and raises the voltage supplied to second rectifier circuit 150 via second filter circuit 180 so as to suppress lowering of the output voltage of second rectifier circuit 150 due to an increase in the load current.

According to the power supply device of this exemplary embodiment, the filter circuit is provided to the secondary winding of high-voltage transformer 120, and the alternating voltage on the secondary side of high-voltage transformer 120 is controlled by the frequency of the alternating voltage supplied from the primary side. Thus, it is possible to constantly control the alternating voltage outputted from the filter circuit. Therefore, the output voltage on the secondary side can be stabilized without the bleeder resistance. It is also possible to constantly control first collector voltage (COL1) and thereby narrow the range of operating voltage of the regulator circuit to stabilize the helix voltage (HELIX) so that a small-size and low-cost regulator circuit can be used. Therefore, it is possible to realize a small-size and low-cost power supply device as with the first exemplary embodiment.

The above-mentioned first and second exemplary embodiments described the characteristics of the present invention by exemplifying the configuration for supplying a high-voltage power supply voltage to each electrode of the traveling-wave tube. However, application of the power supply device of the present invention is not limited to the traveling-wave tube and is also applicable to any device in the case of supplying a desired power supply voltage.

While the invention has been particularly shown and described with reference to exemplary embodiments thereof, the invention is not limited to these embodiments. It will be understood by those ordinarily skilled in the art that various changes in form and details may be made therein without departing from the spirit and scope of the present invention as defined by the claims.

What is claimed is:

1. A power supply device comprising:
   a transformer including a primary winding and a plurality of secondary windings;
   a primary source for supplying an alternating voltage of at least two frequencies to the primary winding; and
   a filter circuit connected to a first secondary winding of said plurality of secondary windings and having an attenuation that varies according to the frequency of the alternating voltage,
   a first rectifier circuit for rectifying the alternating voltage outputted from said filter circuit; and
   a second rectifier circuit for rectifying the alternating voltage outputted from a second secondary winding of said multiple secondary windings,
   wherein the alternating voltage outputted from the second secondary winding does not pass through a filter circuit.

2. The power supply device according to claim 1, wherein:
   except for the second secondary winding of said multiple secondary windings, said filter circuit is connected at least one of the remaining multiple secondary windings.

3. A high-frequency circuit system comprising:
   said power supply device according to claim 2; and
   a traveling-wave tube to which a power supply voltage is supplied from said power supply device.

4. The power supply device according to claim 3, wherein:
   the output of the second rectifier circuit powers a heater of an electron gun of the traveling-wave tube.

5. The power supply device according to claim 1, wherein:
   said primary source outputs:
   an alternating voltage of a first frequency which generates an alternating voltage of the first frequency at the multiple secondary windings that is attenuated by passing through said filter circuit; and
   an alternating voltage of a second frequency which generates an alternating voltage of the second frequency at the multiple secondary windings that is not attenuated even if it passes through said filter circuit.

6. The power supply device according to claim 5, wherein:
   said primary source is configured to continuously output the alternating voltages when changing its output from the first frequency to the second frequency.

7. The power supply device according to claim 6, comprising:
   a current detector for detecting a current passing through said multiple secondary windings; and
   a frequency control circuit for controlling the frequency of the alternating voltage outputted from said primary source so that the alternating voltage outputted from said multiple secondary windings becomes constant according to a current value detected by said current detector.

8. A method of controlling multiple output voltages of a power supply, comprising:
   controlling a magnitude of a first output voltage of the multiple output voltages of the power supply according to a frequency input into the power supply, wherein:
   a filter circuit is connected to a first secondary winding of a plurality of secondary windings of a transformer of the power supply,
   the filter circuit attenuates the magnitude of the first output voltage according to the frequency input into the power supply, and
   a magnitude of a second output voltage of the multiple output voltages of the power supply is not attenuated according to the frequency input into the power supply.

* * * * *